Aug. 8, 1950
G. H. GOLDSTEIN
2,517,785
AUXILIARY SEAT FOR STROLLERS
Filed July 28, 1947
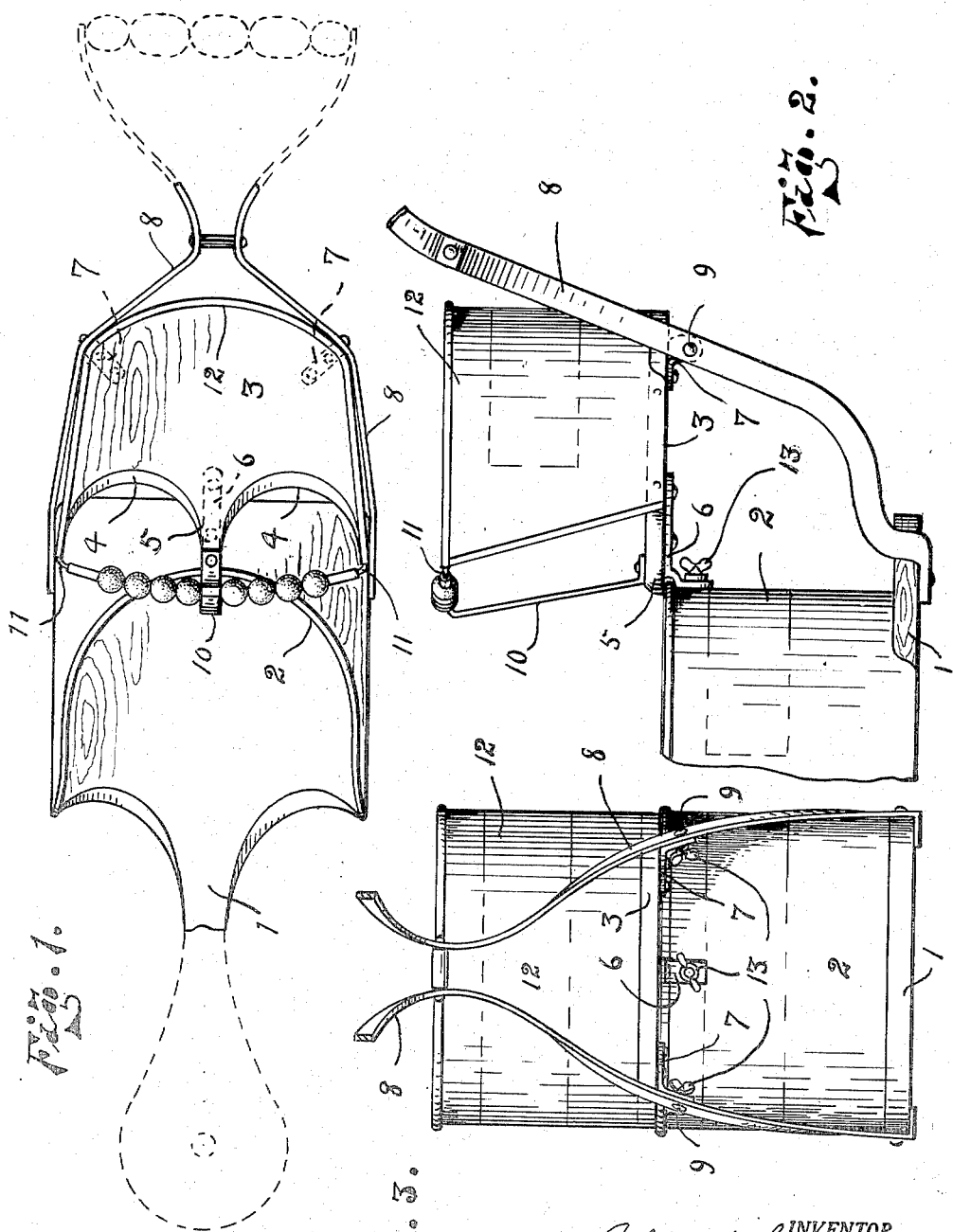
INVENTOR.
Goldie H. Goldstein.
BY
Geo Stevens
atty.

Patented Aug. 8, 1950

2,517,785

UNITED STATES PATENT OFFICE 2,517,785

AUXILIARY SEAT FOR STROLLERS

Goldie H. Goldstein, Duluth, Minn.

Application July 28, 1947, Serial No. 764,219

6 Claims. (Cl. 155—10)

This invention relates to an auxiliary seat for a baby carriage or stroller, one of the principal objects being that of providing a simple inexpensive readily attachable upper seat in tandem with the single seated baby carriage.

Another object is that of making such an auxiliary seat as comfortable and conveniently accessible as possible.

Still another object is to provide such a seat requiring the minimum of changes or additions of parts to common types of strollers.

A further object is that of attaching such a seat in a manner to provide the maximum of comfort to the user of such.

Other objects and advantages will appear as the description of the invention proceeds.

In the accompanying drawing forming part of this application:

Fig. 1 is a top plan view of one of my improved tandem seats and adjacent parts of a common stroller.

Fig. 2 is a side elevational view of Fig. 1, and

Fig. 3 is a rear elevational view of Fig. 1.

In the drawing, the reference numeral 1 represents the main body member of the chassis portion of a common baby stroller and the rear terminal of which forms the main seat of the stroller though usually extends somewhat rearwardly of the back 2 of such seat.

This upstanding back 2, forming also the side walls of the seat, is usually of substantially semi-circular form as shown thus leaving a considerable portion of the flat rearmost end of the main body member 1 extending rearwardly of said back. In the combination here shown, this rearmost extension is utilized as a foot rest for the occupant of the auxiliary seat as illustrated.

Directly above this extension and still further beyond the back 2 is installed the auxiliary seat 3, it having the twin scalloped front edge as at 4 with the foremost end of the reach or tongue portion 5 intermediate of said scallops designed to overlap and rest upon the upper edge of the back 2 of the lower seat as clearly shown in Fig. 2 of the drawing.

Adjacent the overlapping end, though slightly rearwardly thereof and depending from said reach, is the angular holding bracket member 6 the main strap-like body portion of which is securely fixed to the under face of the seat 3.

At the rearmost opposed extremities of the under face of the auxiliary seat 3 are the angle brackets 7—7 somewhat similar to the bracket 6 fixed to the seat and extending outwardly and rearwardly for engagement with the spaced members of the handle 8 common to such a stroller as at 9.

These connections 9—9 as well as that of the bracket 6 to the back 2 of the seat 1 are preferably equipped with wing nuts 13 as shown for convenience in quickly applying or removing the auxiliary seat.

As a front stabilizing member and guard, I have provided the forwardly inclined strut or bracing member 10 fixed to the reach 5 and attached at its upper extremity to the forwardly bowed guard 11 extending from the front opposed corners of the back 12 of the auxiliary seat.

From the foregoing it is apparent that I have provided an extremely simple and practical unit requiring the minimum of modification of a quite common stroller for utilization of the improved attachment, in fact, requiring the provision of but three relatively small holes in a common stroller for purpose.

Having thus described my invention, what I claim is:

1. In a stroller having a combined seat and principal chassis portion wherein the latter extends materially beyond the upright back of said seat and spaced handle members extending upwardly and backwardly from said extension forming an open area intermediate of the upper extremity of said seat back and said handle members; a removable upper seat portion installed within said otherwise open area and supported upon the back of said lower seat and said handle members in a manner to make available said rearmost chassis extension as a foot rest for an occupant of said second seat.

2. In a stroller having a main body and seat portion, an upstanding back for said seat portion, and a pair of spaced handle members extending upwardly and rearwardly of said body and seat portion, said handle members being spaced from said back; an auxiliary seat supported by and intermediate of said handle members and said back in tandem with and above said body and seat portion, said seat having a bracket adjacent the forward end thereof by means of which it is secured to and supported on the upper edge of said back, and a pair of opposed brackets adjacent the rear end thereof by means of which it is secured to and supported on said handle members.

3. In a stroller having a main body and seat portion, an upstanding back for said seat portion, and a pair of spaced handle members extending rearwardly and upwardly from said body and seat portion, said handle members being spaced from said back; an auxiliary seat having a tongue portion at its front edge adjacent the center thereof, a bracket secured to the bottom of said tongue portion and to said back of said seat portion, and a pair of brackets secured in opposed relation to said first mentioned bracket and to each other on the rear edge of said auxiliary seat and to said handle members.

4. The structure as set forth in claim 3 and said tongue portion resting on the upper edge of the back of said seat.

5. In a stroller having a main body and seat portion, an upstanding back for said seat portion, and a pair of spaced handle members extending rearwardly and upwardly from said seat portion, said handle members being spaced from said back; an auxiliary seat having a tongue portion at its front edge adjacent the center thereof, a bracket secured to the bottom of said tongue portion and to said back of said seat to support the front end of said auxiliary seat, and fastening means on the rear edge of said auxiliary seat adjacent said handle members by means of which the rear end of said auxiliary seat is secured to and supported by said handle members.

6. The structure as set forth in claim 5 and said tongue portion being engaged on the upper edge of the said back for said seat portion.

GOLDIE H. GOLDSTEIN.

REFERENCES CITED

The following references are of record in the file of this patent:

UNITED STATES PATENTS

| Number | Name | Date |
| --- | --- | --- |
| 404,356 | Klippert | May 28, 1889 |
| 508,726 | Lange | Nov. 14, 1893 |
| 633,431 | Dann | Sept. 19, 1899 |
| 1,793,848 | Gill et al. | Feb. 24, 1931 |
| 2,426,432 | Breckner et al. | Aug. 26, 1947 |